United States Patent [19]

Charpin et al.

[11] 4,427,424
[45] Jan. 24, 1984

[54] ISOTOPE SEPARATION APPARATUS AND PROCESS

[75] Inventors: Jean Charpin, Paris; Bernard LaRat, Versailles; Raymond Marcel, Breuillet; Pierre Plurien, Palaiseau, all of France

[73] Assignee: Commissariat a l'Energie Atomique, Paris, France

[21] Appl. No.: 212,138

[22] Filed: Dec. 2, 1980

[30] Foreign Application Priority Data

Dec. 17, 1979 [FR] France .................. 79 30862

[51] Int. Cl.³ .............................................. B01D 53/22
[52] U.S. Cl. ................................................... 55/158
[58] Field of Search ........................ 55/16, 158, 17; 210/500.2, 323.2, 637, 433.2; 159/DIG. 27; 165/174

[56] References Cited

U.S. PATENT DOCUMENTS

| 2,946,399 | 7/1960 | Manteufel | 55/17 X |
|---|---|---|---|
| 3,198,335 | 8/1965 | Lewis et al. | 55/158 X |
| 3,509,694 | 5/1970 | Imai et al. | 55/16 |
| 3,585,131 | 6/1971 | Esmond | 159/DIG. 27 |
| 3,974,068 | 8/1976 | Ebner et al. | 210/637 |
| 3,981,696 | 9/1976 | Lalis et al. | 55/158 |
| 4,235,281 | 11/1980 | Fitch et al. | 165/174 X |
| 4,239,624 | 12/1980 | Van Zon | 210/433.2 X |
| 4,268,279 | 5/1981 | Shindo et al. | 55/158 X |

FOREIGN PATENT DOCUMENTS

| 2413990 | 9/1974 | Fed. Rep. of Germany | 55/17 |
| 53-18990 | 6/1978 | Japan | 55/17 |

Primary Examiner—Frank A. Spear, Jr.
Attorney, Agent, or Firm—Pearne, Gordon, Sessions, McCoy, Granger & Tilberry

[57] ABSTRACT

An apparatus and process are disclosed for separation of isotopes by gaseous diffusion. The apparatus comprises at least one assembly of microporous capillary tubes having a hydraulic diameter below 0.5 cm, an average pore radius below 200 Å, a thickness between 20 and 500 microns, a length of at least 25 cm, a porosity between 10 and 60% and a permeability to air between $10.10^{-7}$ and $100.10^{-7}$ mole/cm/²/min/cm of mercury. The tubes are made from an inorganic material and have a circular, square or rectangualr cross-section.

22 Claims, 17 Drawing Figures

ISOTOPE SEPARATION APPARATUS AND PROCESS

BACKGROUND OF THE INVENTION

The present invention relates to a process for isotope separation by gaseous diffusion by means of porous barriers. More specifically, it relates to an isotope separation process making it possible to improve the operating conditions of a gaseous diffusion installation, particularly by reducing the energy consumed in such an above installation.

The presently known apparatus for the separation of isotopes by gaseous diffusion are generally constituted by an assembly of porous barriers in the form of microporous cylindrical tubes, within which is circulated in turbulent manner the gaseous mixture to be separated.

By passing through said tubes, the gaseous mixture is separated into a light isotope-enriched fraction which diffuses through the wall of the tubes, and a light isotope-depleted fraction which is discharged at the outlets from the tubes.

In view of the fact that passing through a porous barrier only leads to a very limited enrichment of the gaseous mixture, to obtain a significant enrichment by the light isotope, this operation must be repeated a significant number of times.

Therefore, a gaseous diffusion isotope separation installation generally comprises a large number of elementary stages grouped in cascade form, each elementary stage being constituted by an assembly of porous barriers.

In the most widely used type of cascade, the stages are grouped in such a way that the enriched fraction leaving the stage is passed to the following stage, whilst the depleted fraction leaving the same stage is passed to the preceding stage. Before being introduced into their respective stages, the enriched and depleted fractions leaving one stage must be compressed in order that their pressure is brought to the selected value for the diffusion.

Therefore, the energy necessary for the operation of such an installation and specifically the power which is more particularly consumed in the performance of the various compression stages is very high, due to the large number of stages.

BRIEF SUMMARY OF THE INVENTION

The present invention relates to a process for isotope separation by gaseous diffusion, making it possible to significantly reduce the specific energy (power consumption per separation work unit in KWh/SWU) of an isotope separation installation, through the use of porous barriers having special characteristics and through the flow conditions established through these barriers.

Therefore, in the gaseous diffusion isotope process according to the invention, for the purpose of the separation microporous capillary tubes are used having a hydraulic diameter D defined by the formula $D=4S/P$ in which S represents the surface of the cross-section of the inner pipe defined by the said tube and P the perimeter of said cross-section which is below 0.5 cm. The gaseous mixture to be separated is circulated in these tubes, so that there is a laminar or almost laminar flow of the gaseous mixture therein.

Advantageously, the gaseous mixture is circulated in such a way that the Reynolds number at the tube inlet is below 4000, preferably below 2000 and above 200.

The invention also relates to an isotope separation apparatus for performing this process. This apparatus comprises at least one assembly of microporous capillary tubes having a hydraulic diameter D defined by the formula $D=4.S/P$, in which S represents the surface of the cross-section of the inner pipe defined by the said tube and P is the perimeter of said cross-section, below 0.5 cm.

Advantageously, the average radius of the pores of the tubes is below 200 Å.

Advantageously, the length of the microporous capillary tube exceeds 25 cm.

Preferably, the capillary tubes have a thickness between 20 and 500 microns, a porosity between 10 and 60% and a permeability to air between $10.10^{-7}$ and $100.10^{-7}$/mole/cm$^2 \times$mn$\times$cm of mercury.

According to an advantageous feature of the apparatus, the tubes are made from an inorganic material selected from the group including alumina, magnesia, titanium dioxide, silica, chromium oxide, mixed oxides of aluminium and magnesium and nickel, as well as certain metal fluorides such as magnesium and nickel fluorides.

According to another advantageous feature of the apparatus, the tubes are made from an organic material, for example polytetrafluoroethylene.

According to the invention, the microporous tubes used can have a circular cross-section or a polygonal cross-section, for example a square or rectangular cross-section.

It is pointed out that in the present text the term tube is understood to mean a cylindrical surface produced by the displacement of a straight line or generatrix which is compelled on the one hand to remain parallel to a fixed direction and on the other to meet a fixed, closed planar curve or directrix, whose plane intersects the given direction.

Thus, a tube can have a circular, elliptical, square, polygonal or any other cross-sectional shape in which the directrix is constituted by a circle, ellipse, square, polygon or the like.

The microporous capillary tubes having the aforementioned characteristics can be produced by any known process, e.g. spinning, casting, extrusion, followed or not followed by isostatic compression and chemical and/or thermal treatment or by deposition on a core followed by isostatic compression and thermal treatment, said deposition being in particular carried out by spraying, dipping or electrophoresis.

The gaseous diffusion isotope separation process according to the invention using porous barriers in the form of capillary tubes with an internal diameter at most equal to 0.5 and a length of at least 35 cm and the establishment within said tubes of a laminar circulation of the gaseous mixture to be separated makes it possible to improve the aerodynamic efficiency of the tubes, which also leads to a significant reduction in the pressure drop within the tubes. This improvement in the aerodynamic efficiency and this reduction of the pressure drop within the tubes leads to a specific energy gain.

It is pointed out that the specific energy of a stage of an isotope separation installation, i.e. the specific energy of a porous barrier corresponds to the relationship:

$$\frac{W}{\delta U}$$

in which W represents the energy consumption and $\delta U$ the separative work.

The energy consumption W is the sum of energy W' necessary for compressing to the intake pressure $p_e$ the diffused flow leaving the stage (n−1) at pressure $p_{av}$ and the energy W" necessary for compressing to intake pressure $p_e$ the poor flow leaving the stage (N+1) at pressure $p_s$. In a diffuser at balance, the diffused flow and the poor flow are equal to Qe/2, Qe being the intake flow of each stage.

The energies W' and W" corresponding to an adiabatic compression of efficiency $n_c$ at temperature $T_c$ are given by the formulas:

$$W' = \frac{\gamma}{\gamma - 1} \frac{Qe}{2M} \frac{RTc}{n_c} \left( \tau_c \frac{\gamma - 1}{\gamma} - 1 \right)$$

$$W'' = \frac{\gamma}{\gamma - 1} \frac{Qe}{2M} \frac{RTc}{n_C} \left( \tau_r \frac{\gamma - 1}{\gamma} - 1 \right)$$

in which for uranium hexafluorides $$\gamma = \frac{C_p}{C_v},$$

i.e. 1.065, M=0.238 kg, R=8.314 Joules, $\tau_c$ is the compression ratio of the diffused gas equal to $p_e/P_{av}$ and 96 $\tau$ the compression ratio of the poor gas equal to $P_e/P_s$.

The separative work $\delta U$ is given from the formula:

$$\delta U = \tfrac{1}{2} Qe \frac{\theta}{1 - \theta} \epsilon^2$$

in which $\theta$ is the distribution coefficient between the enriched and depleted flows, i.e. 0.5 in a diffuser at balance and $\epsilon$ is the isotope separation coefficient of the stage given by the formula:

$$\epsilon = \epsilon_o SZ \frac{1 - \theta}{\theta} \text{Log} \frac{1}{1 - \theta}$$

in which $\epsilon_o = 43.10^{-4}$ for UF$_6$;
S is the separation efficiency of the microporous barrier given by the formula:

$$S = \left(1 - \frac{1}{\tau^c}\right) \exp \cdot \frac{P_e - P_{av}}{P}$$

in which P is a constant given by the equation:

$$\frac{1}{P} = 3.8 \times \frac{3r_p}{16\eta \overline{V_2}}$$

$\eta$: gas viscosity at process temperature
$V_2$: average velocity of the heavy isotope
$r_p$: average radius of pores
$P_e$: upstream pressure
$P_{av}$: downstream pressure
Z is the aerodynamic efficiency given under laminar flow conditions by the formula:

$$Z = 1 - a \frac{R_e r_h}{L}$$

in which $R_e$ is the Reynolds number at the entrance to the microporous barrier, $R_h$ the hydraulic radius of the capillary tube, L the capillary tube length and a a coefficient dependent on the tube cross-section. In the case of capillary tubes with a circular cross-section, a is equal to 0.04511.

In the case of uranium hexafluoride, the specific energy can be expressed by the formula:

$$\frac{W}{\delta U} = 17.9 \, T_c \frac{\tau_c 0.061 + \tau_r 0.061 - 2}{\eta_c S^2 Z^2}$$

In this formula, W/$\delta$U is in KWh/SWU, $\delta$U being calculated with Qe expressed in kilograms of uranium per annum.

Thus, with the process of the invention leading to an increase in the aerodynamic efficiency value Z and to a decrease in the value $\tau r$, a lower specific energy is obtained.

It is apparent from the equation that it is advantageous to work with the highest possible value of S, which in practice leads to the limitation of the average pore radius values to below 200 Å.

According to a first embodiment of the apparatus according to the invention, the assembly of the microporous capillary tubes is constituted by microporous tubes arranged parallel to one another, each of their ends being fixed to a plate, called an assembly plate, said tubes being arranged within the assembly in rows parallel to a given direction, called the first direction, whilst also forming rows parallel to the second direction perpendicular to the first direction.

Advantageously, in this embodiment, the microporous capillary tubes have a circular cross-section and the tubess of each row parallel to the first direction are in tangential contact with one another.

This embodiment of the assembly is particularly advantageous because it leads to a very compact assembly having a large number of capillary tubes without causing a disturbance in the gas flow which has passed through the wall of the tubes.

Thus, the passage of reception channels between the rows of tubes makes it possible to pipe the diffused gas and consequently obviates high pressure drops in the circuit of the gas separated by diffusion.

According to a variant of this first embodiment the microporous capillary tubes are regularly spaced from one another in each of the rows parallel to the first or second directions.

In this case, the distance $d_1$ between the planes defined by the axes of tubes of two adjacent rows parallel to the first direction preferably exceeds the distance $d_2$ between the axes of two adjacent tubes of a row parallel to the first direction.

Preferably, when the tubes have a circular cross-section distance $d_2$ is such that the value of $(d_2-/d_{ext})$ in which $d_{ext}$ designates the external diameter of the tubes is at the most equal to 2 mm and the distance $d_1$ is such that the value of $(d_1-d_{ext})$ is between 0.5 and 3 mm.

According to a second embodiment, the assembly of the microporous tubes is constituted by microporous tubes arranged parallel to one another and forming in said assembly a first series of ducts, called first ducts defined by the inner wall of the tubes, said assembly having a plurality of longitudinal partitions integral with at least certain of the tubes and distributed between the tubes so as to define with the outer wall of the latter a second series of ducts, called second ducts parallel to the first ducts.

In this second embodiment, the tubes and partitions are advantageously reciprocally arranged in such a way that the second ducts all have the same cross-section which is preferably such that the ratio of the cross-section of the second ducts to the cross-section of the first ducts is between 1 and 20.

According to a feature of this second embodiment the tubes of the assembly are mounted on two plates, the partitions extending from one plate to the other and have openings for the discharge of the separated gas circulating in the second ducts.

According to a variant, the tubes of the assembly are mounted on two plates, the partitions extending from one of the plates to the vicinity of the other plate in such a way that in the vicinity of said other plate openings are provided for discharging the separating gas circulating in the second ducts.

In this second embodiment, the presence of longitudinal partitions which in part define within the assembly reception ducts for the gas separated by diffusion through the wall of the tubes makes it possible to improve the separation efficiency of the installation by creating countercurrent effects, i.e. by making the separated gas flow in second ducts in the opposite direction to the gaseous mixture to be separated which flows in the first ducts.

For example, this result can be obtained by providing openings in the longitudinal partitions arranged so as to only permit a discharge of the separated gas circulating in the second ducts in the immediate vicinity of the end of the tubes corresponding to the intake of the gaseous mixture to be separated.

Moreover, the presence of the longitudinal petitions give such an assembly a good mechanical strength due to the high moment of transverse inertia of the system and to the very close and compact network of partitions. This also makes it possible to obtain a low or negligible pressure drop in the second ducts in which the gas separated by diffusion flows.

Preferably, the partitions of the assembly are made from the same material as the tubes. In this case, the assembly having a plurality of tubes joined by longitudinal partitions can be directly manufactured in its final form from an organic or inorganic microporous material paste, for example by extruding the paste through a spinneret of shape adapted to that of the assembly to be obtained, said extrusion being followed by a chemical and/or thermal treatment of the thus obtained assembly.

The extrusion paste used can be constituted by any conventional extrusion material complying with the conditions required for the use of the assembly. Advantageously, the extrusion paste contains particles of a metal oxide such as alumina, magnesia, titanium dioxide and silica coated, for example, with organic and preferably thixotropic binders like a terpineal seresine mixture. It is also possible to use other binders, such as water binders, more particularly from the gum tragacanth group or even thermoplastic binders.

By choosing a spinneret with a suitable geometry, it is possible to obtain in a single operation an assembly of microporous tubes joined by longitudinal partitions.

The openings in the partitions can be made during the extrusion operation or after baking the assembly obtained, for example by mechanical machining or by cutting using laser radiation.

Preferably, these openings are produced during the extrusion operation by stopping the injection of the paste by means of a comb in the locations corresponding to the partitions. Thus, the partitions are interrupted over a length representing for example 10% of the total length of the tubes, which preferably happens at one of their ends.

However, such assemblies can also be obtained by producing the rows of tubes by extrusion and by then assembling said tube rows by means of spacers fixed to certain of the tubes by conventional processes.

According to a third embodiment of the invention, the assembly is constituted by an alveolar or honeycomb module, whose walls made from microporous material with an average pore radius below 200 Å, define rows of parallel channels having a square or rectangular cross-section, said rows alternately forming a first series of ducts, called first ducts having a hydraulic diameter below 0.5 cm and in which the gaseous mixture to be separated is circulated, and a second series of ducts, called second ducts in which is collected the gas separated by diffusion through the wall of said first ducts.

Advantageously, in this third embodiment, the second ducts are sealed at each of their ends, opening being provided in each row of second ducts so as to ensure the discharge of the gas separated by the side walls of the module.

According to the invention, the isotope separation apparatus preferably has several microporous capillary tube assemblies. In this case, the apparatus advantageously comprises a cylindrical enclosure in which are successively arranged a plurality of assemblies of microporous tubes which are parallel to the enclosure axis, said assemblies being in each case mounted between two plates, called diffuser plates and separated from one another so as to provide between two adjacent assemblies and at each of the ends of the enclosure successive chambers which alternately constitute distribution chambers for the gaseous mixture to be separated in the microporous tubes issuing into the latter and collection chambers for the gas leaving the tubes issuing into the latter, means for supplying the distribution chamber with the gaseous mixture to be separated, means for extracting from the said collection chambers the gas leaving the tubes of said assemblies and means for collecting the gas which has passed through the wall of the tubes of each of said assemblies.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
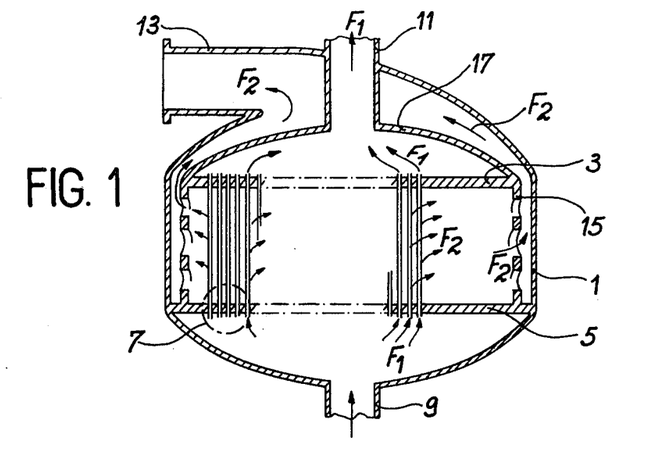
FIG. 1 in vertical section an isotope separation apparatus according to the invention.

FIG. 1 shows an isotope separation apparatus comprising an enclosure 1 within which are vertically mounted between two horizontal plates 3 and 5, called diffuser plates, assemblies 7 of microporous capillary tubes having an internal diameter at the most equal to 0.5 cm, advantageously below 0.25 cm and preferably below 0.12 cm. The diffuser plates are provided with an opening for fitting each assembly and are, for example, made from metal such as stainless steel, Monel or a steel coated in order to prevent corrosion or alternatively can be made from a plastics material such as Teflon.

At the bottom of enclosure 1, the lower plate 5 defines a chamber for the introduction of the gaseous mixture to be separated which is supplied under high pressure by pipe 9.

The gaseous mixture then passes into the tube assembly 7 in which it is separated into a depleted fraction which is discharged under high pressure in accordance with the path of arrows $F_1$ by pipe 11 and a fraction enriched by diffusion through the wall of the capillary tubes which is discharged under low pressure following the path of arrows $F_2$ by pipe 13.

In the embodiment of FIG. 1, plates 3 and 5 are interconnected by a perforated vertical partition 15 defining with the inner wall of enclosure 1 an annular passage for discharging low pressure gases towards pipe 13.

The upper plate 3 is surmounted by a dome 17 defining with plate 3 a high pressure gas collecting chamber.

Figure 2:
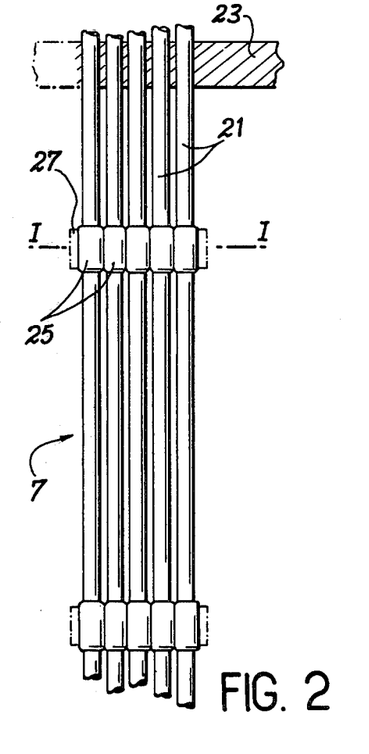
FIG. 2 in vertical section a capillary tube assembly of the apparatus of FIG. 1.

As can be seen in FIG. 2, an assembly 7 is constituted by a plurality of microporous capillary tubes 21 arranged parallel to one another and fixed by each of their ends to a plate, called an assembly plate, whereof only the upper plate 23 is shown in the drawing.

These assembly plates are provided with circular openings with a diameter substantially equal to the external diameter of capillary tubes 21 and are advantageously made from a metal such as nickel or aluminium. The sealing with respect to the passages of tubes 21 in the openings of assembly plates 23 is brought about, for example, by a phosphate glass such as P 106.

Figure 3:
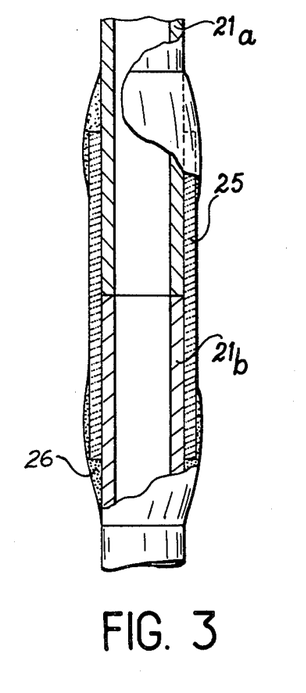
FIG. 3 in part, a capillary tube of the assembly of FIG. 2.

As can be seen in greater detail in FIG. 3, the microporous capillary tubes 21 of assembly 7 are constituted by elementary capillary tubes such as 21a and 21b assembled end to end by means of cylindrical sleeves 25 made, for example, from aluminium or nickel and having, for example, a thickness of approximately 0.2 mm. The seal between sleeve 25 and the elementary tubes 21a and 21b is provided by a deposit 26 of an aluminium or alumina powder applied, for example, by atomizing or spraying.

The seal between tubes 21a and 21b can also be provided by uranium hexafluoride-resistant phosphate glasses such as P 106 or fluorine-containing glasses or by means of polytetrafluoroethylene-based emulsions or glues.

According to the invention, the elementary tubes 121a or 21b have a thickness between 20 and 500 microns, a porosity of 10 to 60%, a permeability to air between $10.10^{-7}$ and $100.10^{-7}$ mole/cm$^2$/minute/cm of mercury. The length of the capillary tubes 21 preferably exceeds 50 cm and they generally comprise a plurality of elementary tubes such as 21a assembled end to end.

Figures 4, 5, 6:
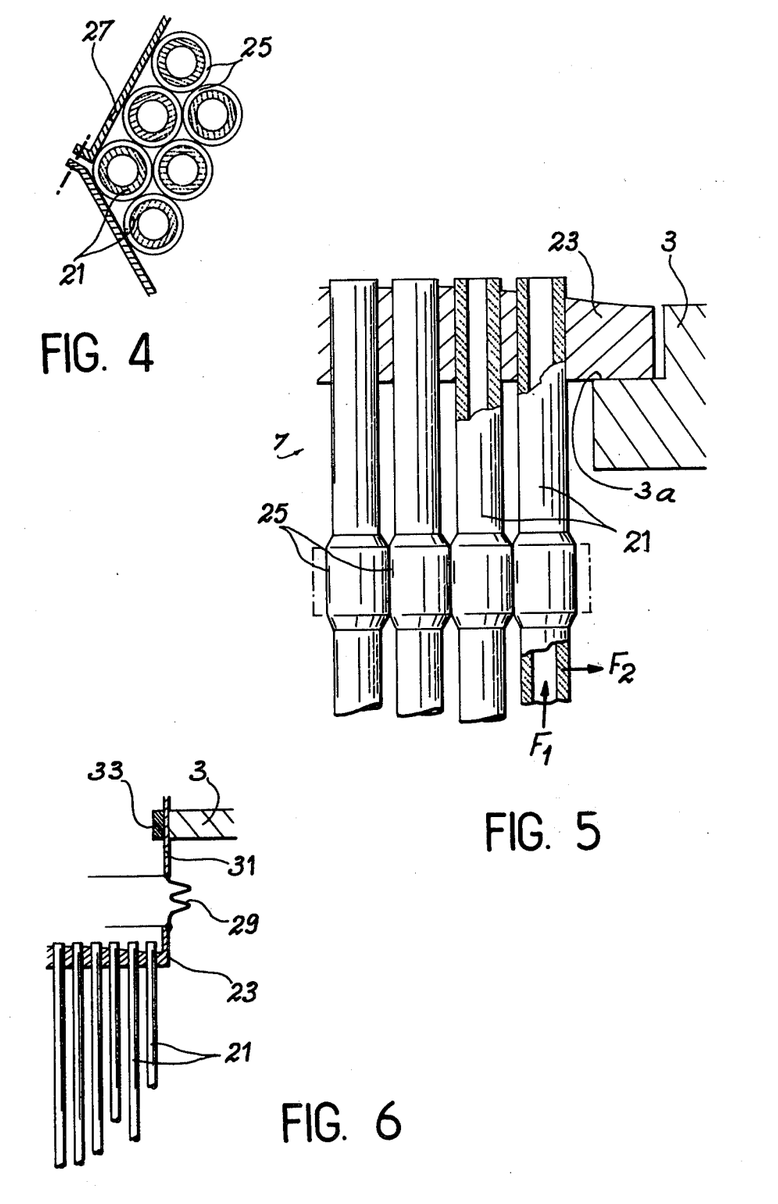
FIG. 4 a cross-section along the line I—I of the assembly of FIG. 2.
FIG. 5 a first mode of fitting a capillary tube assembly on the upper plate of the isotope separation apparatus.
FIG. 6 a second mode of fitting a capillary tube assembly on the upper plate of the isotope separation apparatus.

As can be seen from FIGS. 2 and 4, the tubes 21 of an assembly 7 are radially secured by means of elastic fastening means 27 at sleeves 25. Thus, sleeves 25 are in contact with one another and also keep tubes 21 at a given spacing corresponding to the thickness of said sleeves 25. These elastic fastening means comprise, for example, strips of a metallic material or a plastics material such as Teflon. Thus, the tubes are assembled in accordance with a hexagonal pattern.

Tubes 21 can be assembled in a hexagonal group and kept at a desired spacing by means of a square-meshed, plastic or metallic gauze with a side dimension substantially equal to the external diameter of the tubes by positioning the latter in the locations of the metal gauze corresponding to every other mesh.

Thus, an assembly of 300 tubes with an external diameter of 1 mm occupies a cross-sectional area of 6.65 cm$^2$, representing a cylindrical group with a diameter of 29 mm.

FIGS. 5 and 6 show two modes of fitting an assembly in a corresponding opening of the upper diffuser plate 3.

In FIG. 5, assembly 7 is fitted to diffuser plate 3 by means of assembly plate 23 bearing on a shoulder 3a of the corresponding opening of said plate 3.

In the fitting mode according to FIG. 6, the assembly plate is connected by means of a metal bellows 29 to an annular metal member 31, whose free edge is fixed to the edge of the opening of plate 3, for example via a ring 33.

The diffuser advantageously comprises one thousand assemblies, each having 300 microporous capillary tubes. These assemblies are arranged according to a hexagonal pattern in corresponding openings with a diameter of approximately 30 mm in plates 3 and 5. The distance between the centers of the assemblies is approximately 37 mm.

Thus, the 1000 assemblies occupy a cross-section of 4.74 m$^2$ corresponding to a circular section with a diameter of 2.46 m.

In an isotope separation apparatus of this type having 0.06 cm diameter capillary tubes, the intake flow rate of one tube is 0.0106 g of UF$_6$/seconds. Thus, the total flow rate of the apparatus with 1000 assemblies of 300 tubes will be 3.18 kg of UF$_6$/second.

To prevent pressure drops, the diameters of pipes 9, 11 and 13 are definitely fixed in such a way that the gas velocity in each of the pipes is 2 m/sec.

Hereinafter, two exemplified embodiments of an installation for separating isotopes from the uranium by uranium hexafluoride diffusion through microporous capillary tubes are described.

EXAMPLE 1

The alumina tubes have the following characteristics:
length 100 cm
internal diameter 0.06 cm
thickness 330 microns
porosity 0.2
average radius of pores 91 Å
permeability to air at 20° C.: $31.10^{-7}$ mole/cm$^2$/minute/centimeter of Hg.

By means of such installation, the specific energy is reduced by approximately 33% compared with a conventional installation under the following operating conditions:
temperature 70° C.
pressure at intake of tubes $P_e = 1$ bar
Reynolds number $R_e = 1,100$
downstream pressure $P_{av} = P_e/4.5$
pressure drop in tube: 34 millibars
intake flow rate $= 3.03.10^{-5}$ mole/sec, i.e. 0.0106 g of UF$_6$/sec
diffused flow = poor flow = 0.005325 g of UF$_6$/sec.

EXAMPLE 2

The tubes have the following characteristics:
length 100 cm
internal diameter 0.06 cm
thickness 360 microns
porosity 0.2
permeability to air at 20° C.: $34.10^{-7}$ mole/cm$^2$/min/cm of Hg
average radius of pores: 105 Å

By means of such an installation, a specific energy reduction of approximately 28% is obtained compared with a conventional installation under the following operating conditions:
temperature 100° C.
Reynolds number 1100
intake pressure $P_e = 1$ bar
downstream pressure $P_e/4.5$
pressure drop in tube: 44 millibars
intake flow rate: 0.0106 g of UF$_6$/sec
diffused flow = poor flow = 0.005325 g of UF$_6$/sec.

Figure 7:
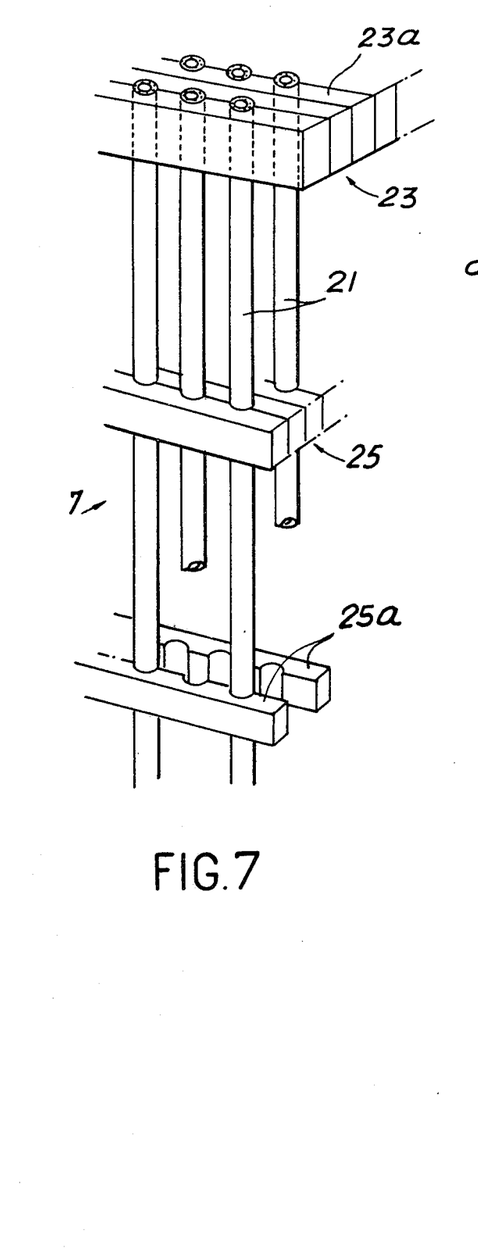
FIG. 7 a perspective view of a first mode of assembly of the microporous capillary tubes.

FIG. 7 is a perspective view of a microporous capillary tube assembly 7 corresponding to the first embodiment of the invention. In this assembly, the microporous capillary tubes 21 are mounted at the end thereof on a plate 23 produced from welded together unitary elements 23a.

Figure 8:
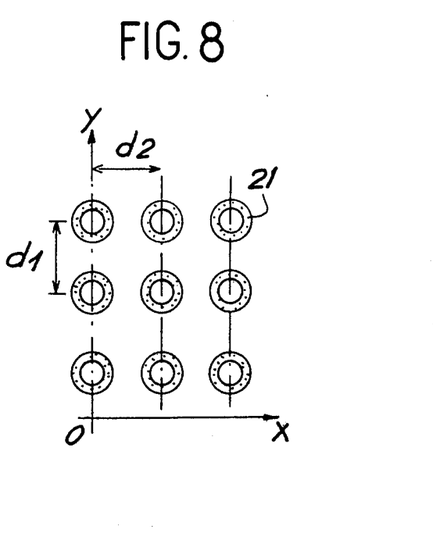
FIG. 8 an embodiment of this first assembly mode.

On referring to FIG. 8, it is possible to see that in this first embodiment, the microporous tubes 21 are distributed in rows parallel to a first direction OX, the plane defined by the axes of the tubes of one row being at a distance $d_1$ exceeding the external diameter $d_{ext}$ of said tube from the plane defined by the axes of the tubes in an adjacent row.

The microporous tubes 21 are also distributed so as to form rows of tubes parallel to a second direction OY perpendicular to the first direction OX. In a row parallel to direction OX, the tubes are regularly spaced from one another by a distance $d_2$, representing the gap separating the axes of two adjacent tubes.

Preferably, according to the invention, the distance $d_1$ exceeds distance $d_2$, so as to define between the rows of tubes parallel to the first direction OX passages which favor an appropriate flow of the gaseous mixture having diffused the wall of tubes 21. In this way, it is possible to obtain a very compact assembly by minimizing the pressure drops between the tubes for the gaseous mixture which has diffused through the walls of the tubes.

As shown in FIG. 7, tubes 21 are mounted in sealed manner at their ends on plates 23, whereof only one is shown in the drawing and made for example from Teflon. Plate 23 is formed from unitary elements 23a having a profile such that two such elements can completely surround either a row of tubes parallel to the first direction OX or a row of tubes parallel to the second direction OY. Elements 23a are welded to one another, e.g. by hot pressing to form a plate 23 into which are sealingly fitted the ends of tubes 21.

Tubes 21 can be given a suitable spacing by spacers 25 positioned at different levels of assembly 7. The spacers 25 can also be made from elementary components of the same type 25a as those used for forming plates 23. However, it is not necessary to tightly fix said components together in order to obtain a tight system.

Figure 9:
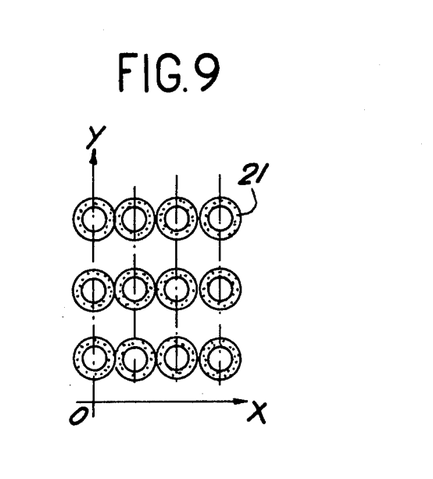
FIG. 9 another embodiment of the first assembly mode.

FIG. 9 shows another embodiment of assembly 7 differing from that of FIG. 8 because the microporous tubes 21 of the rows parallel to the first direction OX are in tangential contact with one another.

In this way, passages are defined between the rows of tubes parallel to the first direction OX in which circulates the gaseous mixture having diffused through the wall of the tubes. This makes it possible to further improve the compactness of an assembly of this type due to the preferential flow of the diffused gas to the thus formed passages. This makes it possible to prevent significant pressure drops in the diffused gas circuit.

Preferably, when the overall geometry of the isotope separation apparatus permits, these assemblies of tubes are arranged in the apparatus in such a way that the passages formed between the rows of tubes parallel to direction OX are located substantially in the axis of the diffused gas discharge pipe.

Figures 10, 11:
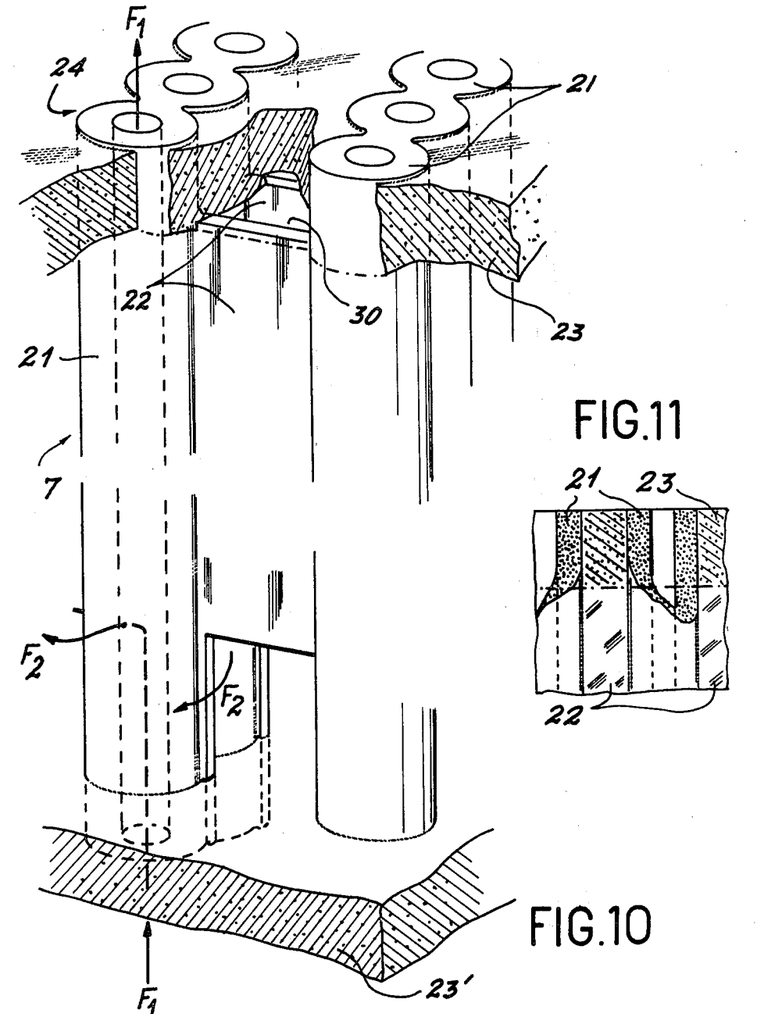
FIG. 10 a perspective view of a second assembly mode for the tubes according to the invention.
FIG. 11 a detail of the mode of fitting the tubes to an end plate of the assembly of FIG. 10.

FIG. 10 is a perspective view of an assembly of microporous tubes corresponding to the second embodiment of the invention. It is possible to see that assembly 7 comprises microporous tubes 21 which are positioned parallel to one another and a plurality of longitudinal partitions arranged between tubes 21 and fixed to the latter.

Thus, it is possible to define in the assembly a first series of ducts 24 bounded by the inner wall of the microporous tubes 21 and a second series of ducts 30 bounded by the outer wall of tubes 21 and by partitions 22.

Tubes 21 are mounted by their other end on plate 23 and by their lower end on plate 23'. The partitions 22 extend longitudinally of plate 23 up to the vicinity of plate 23', so that in the immediate vicinity of plate 23' openings are provided making it possible to ensure the discharge of the enriched gas circulating in the second ducts 30 defined between tubes 21 by partitions 22 and the outside of the wall of tubes 21.

Obviously, the openings for discharging the gas circulating in the second ducts can be differently positioned within assembly 7. Thus, the partitions 22 can extend longitudinally from plate 23 to plate 23' and can be provided with openings distributed between the said plates.

Preferably and as illustrated in FIG. 10, the openings of the second ducts 30 are positioned in the immediate vicinity of end plate 23' of the assembly. This corresponds to the entrance (arrow $F_1$) and to tubes 21 of high pressure gas in order to create in the second ducts a counterflow effect by circulating the enriched gas (arrow $F_2$) in the opposite direction to the gaseous mixture flowing in microporous tubes 21.

The fitting of assembly 7 to plates 3 and 5 of enclosure 1 is brought about by means of end plates 23, 23' made, for example, from Teflon and fixed to tubes 21 and partitions 22.

To this end, during the manufacture of assembly of microporous tubes 21 joined by partitions 22, the latter are interrupted in the vicinity of the end of the tubes so as to make it subsequently possible to introduce the ends of tubes 21 into the corresponding openings of Teflon plates 23, 23' which have been machined beforehand. In this way, plates 23, 23' can bear, in the manner shown in FIG. 11, on the partitions 22 and sealing can then be obtained between tubes 21, partitions 22 and plates 23, 23' by casting Teflon on plates 23, 23'.

Sealing can also be obtained by casting a material which resists the corrosion of fluorine-containing products, e.g. by means of a phosphate glass such as P 106.

Obviously, when partitions 22 have to be interrupted in the vicinity of an end plate to provide openings in the second duct, the corresponding end plate is mounted on tubes 21 without it bearing against partitions 22. A seal is subsequently only provided between tubes 21 and the end plate.

In the same way, assembly 7 can be fitted to plates 3 and 5 via a metal end fitting fixed to each end of the assembly and secured in the corresponding openings of FIGS. 3 and 5.

On referring to FIGS. 12 to 15, it is possible to see a number of examples of microporous assembly of tubes having a circular or square cross-section.

Figures 12, 13, 14:
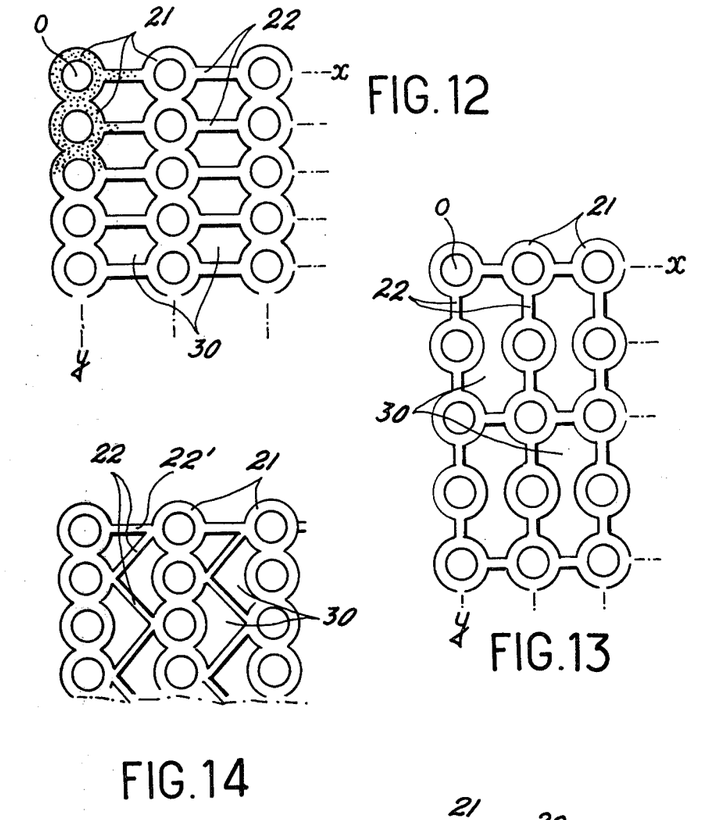
FIGS. 12, 13, 14 and 15 cross-sections of different embodiments of the second mode of assembly of the microporous tubes according to the invention.

FIG. 12 is a part cross-sectional view of a tube assembly with a circular cross-section in which the tubes are distributed with a rectangular spacing. In this assembly, the microporous tubes 21 are distributed in parallel rows in two orthogonal directions OX and OY. The tubes 21 of rows parallel to direction OY are in tangential contact with one another, whilst the tubes 21 of rows parallel to direction OX are regularly spaced from one another in each row, the adjacent tubes of one row being joined by partitions 22 parallel to direction OXY.

In exemplified manner, it is possible to assemble in this way 200 microporous tubes having an internal diameter of 1 mm and an external diameter of 1.5 mm with partitions of length 1.5 mm and thickness 0.3 mm.

The thus obtained assembly has a cross-section of 2.85 cm with a side dimension of 3 cm. It comprises rows of 10 tubes in direction OX and 20 tubes in direction OY. The ratio of the cross-section of the first ducts defined within tubes 9 and the second ducts defined by the partitions and the outer wall of tubes 9 is 3.48.

FIG. 13 is a part sectional view of an assembly of tubes with a circular cross-section in which the microporous tubes are distributed with a square spacing.

In this assembly, the microporous tubes 21 are distributed in rows parallel to two orthogonal directions OX and OY. The tubes 21 of rows parallel to direction OY are regularly spaced from one another and partitions 22 parallel to direction OY are provided between two adjacent tubes of each row. The tubes 21 of rows parallel to direction OX are regularly spaced from one another and partitions 22 parallel to direction OX are provided in every other row of tubes parallel to direction OX so as to join two adjacent tubes of the same row.

For example, in this way, 169 microporous tubes have been assembled having internal diameters of 1 mm, external diameters of 1.50 mm with partitions of length 0.75 mm and thickness 0.3 mm. In this assembly, the ratio of the cross-section of the second ducts to the cross-section of the first ducts is 6.45.

Such an assembly with 169 tubes has a square cross-section of 2.85 cm side dimension, each row of tubes parallel to the direction OX or direction OY being formed by 13 tubes.

FIG. 14 is a part cross-sectional view of an assembly of tubes with a circular cross-section in which the tubes are distributed with a rectangular spacing.

In this assembly, the microporous tubes 21 are distributed in rows parallel to two orthogonal directions OX and OY. The tubes 21 of rows parallel to direction OY are in tangential contact with one another and tubes 21 of rows parallel to direction OX are regularly spaced from one another. In this assembly, the partitions 22 are distributed obliquely between two successive rows of tubes parallel to direction OY so as to join a tube of a row parallel to OX to a tube of the adjacent row parallel to OY. Moreover, this assembly has partitions 22' between two adjacent tubes of two rows of tubes parallel to OX located on the periphery of the assembly.

As an example, 200 tubes have been assembled in this way having an internal diameter of 1 mm and an external diameter of 1.5 mm oblique partitions 22 of length 2.12 mm and partitions 22' of length 1.5 mm, all the partitions having a thickness of 0.3 mm.

In this assembly, the ratio of the cross-section of the second ducts 30 defined tubes 21 by partitions 22 to the cross-section of the first ducts is 2.86.

Figure 15:
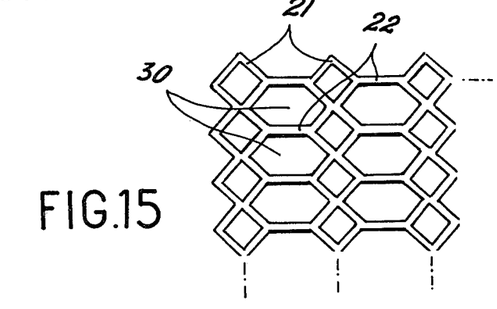

FIG. 15 is a part cross-sectional view of an assembly of tubes with a square cross-section distributed with a rectangular spacing.

In this assembly, the microporous tubes are distributed in rows parallel to two orthogonal directions OX and OY. The tubes 21 of rows parallel to direction OY are in contact with one another by their edges and the tubes 21 of rows parallel to direction OX are regularly spaced from one another. Two adjacent tubes are joined by a longitudinal partition parallel to direction OX.

As an example, 200 square tubes were assembled in this way having an external side of 1.6 mm and an internal side of 0.46 mm. The length of the partitions 22 joining two adjacent tubes of a row parallel to direction OX is 1.5 mm and its thickness is 0.3 mm. In this assembly, the ratio of the cross-section of the second ducts 30 defined by partitions 22 and the outer wall of tubes 21 to the cross-section of ducts defined within tubes 21 is 16.

Several assemblies like those illustrated by those in FIGS. 12 to 15 can be mounted between plates 3 and 5 of the apparatus of FIG. 1 by leaving a gap of approximately 5 mm between each assembly to permit the discharge towards outlet 13 of diffused gas leaving each assembly.

Figure 16:
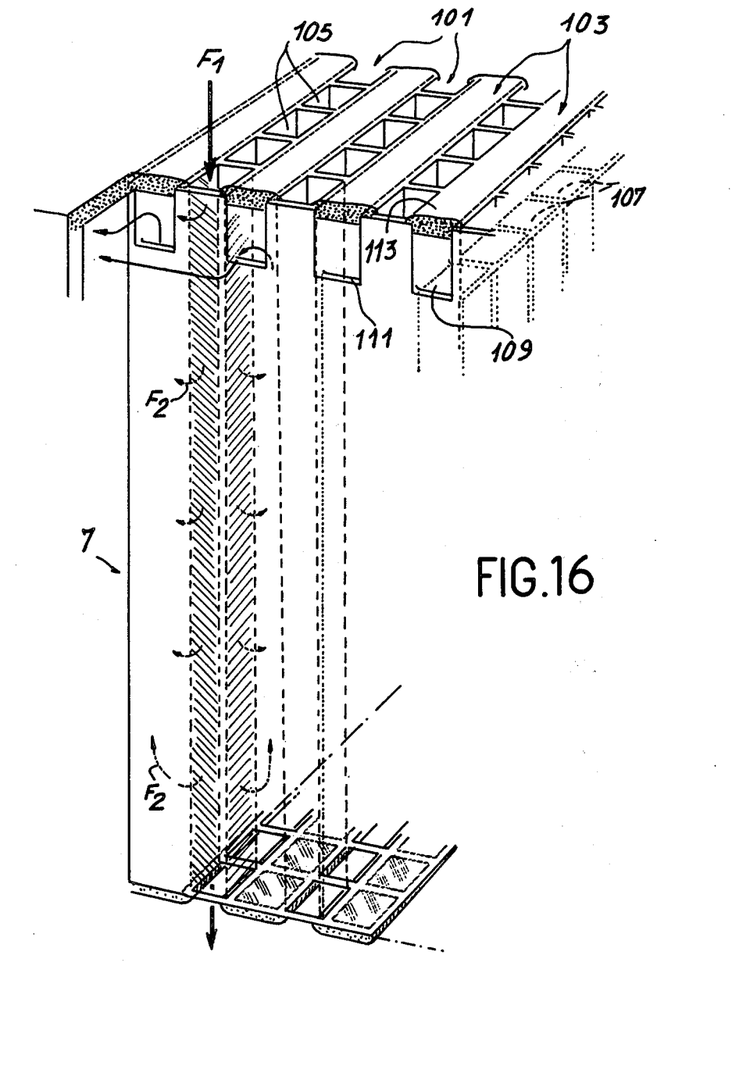
FIG. 16 an assembly corresponding to the third embodiment of the invention.

FIG. 16 shows another type of assembly corresponding to a third embodiment of the invention. In this drawing, it can be seen that assembly 7 comprises an alveolar or honeycomb module, whose walls made from microporous material define two rows of channels designated alternatively by the references 101 and 103.

The channels of rows 101 constitute a first series of ducts 105, called first ducts, having a hydraulic diameter below 0.5 cm. The channels of rows 103 constitute a second series of ducts 107, called second ducts.

It should be noted that in each row the channels have a square or rectangular cross-section and that two adjacent channels have a common wall. The gaseous mixture to be separated is circulated in the first series of ducts 105 (arrow $F_1$), whilst in the second series of ducts 107 is collected the gas separated by diffusion through the wall of the first ducts (arrow $F_2$).

Advantageously, in such an assembly, the second ducts 107 are sealed at each of their ends and in the upper part of the module openings 109 are formed in each row of channels 107 to ensure the discharge of the gas separated at the side walls of the module.

Such openings can be formed in the following way. After manufacturing the module, slots such as 111 are formed in the rows of channels 103, e.g. by machining with a suitable tool. The upper parts of the module corresponding to rows 103 are then sealed by covering them with a tight material 113. As a result, it is possible to discharge the gas diffused by the side walls of the module and to circulate the gaseous mixture to be separated in ducts 105 by introducing it into the upper part of the module.

Figure 17:
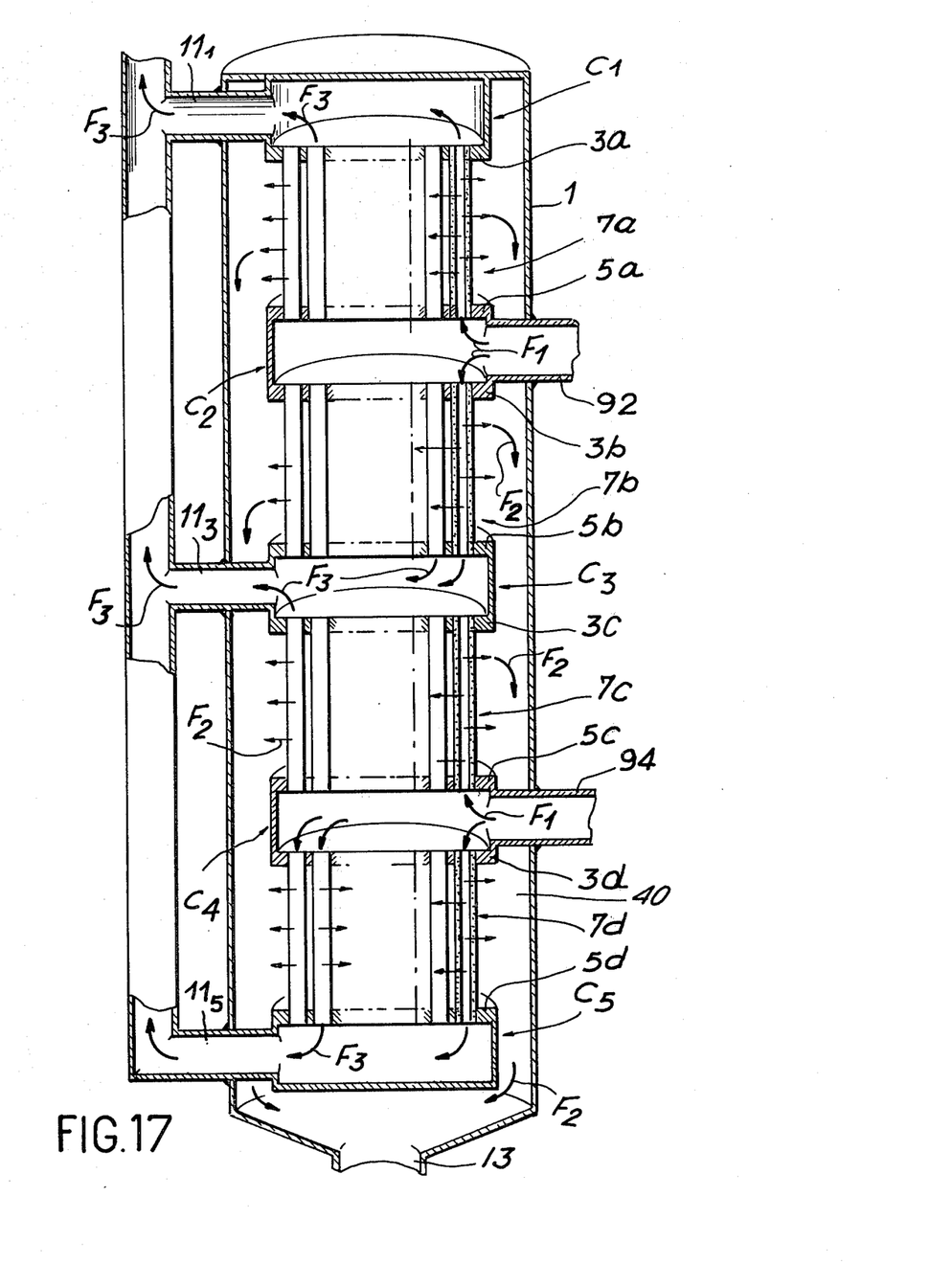
FIG. 17 a vertical section of a gaseous diffusion isotope separation apparatus incorporating a plurality of microporous tube assemblies.

FIG. 17 is a perspective view of an isotope separation apparatus with a plurality of assemblies of microporous tubes.

This apparatus comprises a vertical cylindrical enclosure 1 in which are successively vertically arranged four assemblies of microporous capillary tubes $7a$, $7b$, $7c$, $7d$. Each of these assemblies is mounted between two plates, called diffuser plates, such as $3a$ and $5a$ . . . $3d$ and $5d$. These assemblies are separated from one another so as to provide successive chambers $C_1$, $C_2$, $C_3$, $C_4$ and $C_5$ between two adjacent assemblies such as $7a$ and $7b$ and at each of the ends of the enclosure.

It should be noted that chambers $C_2$, $C_3$ and $C_4$ are defined by the diffuser plates of two adjacent assemblies, e.g. chambers $C_2$ by plates $5a$ and $3b$ of adjacent assemblies $7a$ and $7b$ and that they are connected to the tubes of said two assemblies.

Conversely, the end chambers $C_1$ and $C_5$ are only linked with the tubes of a single assembly such as $7a$ or $7d$.

The successive chambers $C_1$ to $C_5$ alternately constitute distribution chambers for the gaseous mixture to be separated and collection chambers for the gaseous mixture leaving the tubes of the assemblies.

Thus, chambers $C_2$ and $C_4$ form distribution chambers respectively making it possible to distribute the gaseous mixture to be separated in the microporous tubes of two adjacent assemblies $7a$, $7b$, $7c$, $7d$. In the same way, chambers $C_1$, $C_3$ and $C_5$ form collection chambers, chamber $C_3$ serving to collect the gaseous mixture from the tubes of two adjacent chambers $7b$ and $7c$, whilst chambers $C_1$ and $C_5$ only collect the gas from assemblies $7a$ and $7d$ respectively.

The gaseous mixture to be separated by diffusing through the microporous tubes of different assemblies of the apparatus is introduced into chambers $C_2$ and $C_4$ by pipes $9_2$, $9_4$. Following the arrows $F_1$ this gas then passes into the microporous tubes of each of the assemblies of the apparatus and is collected in collection chambers $Cl_1$, $C_3$, $C_5$ (arrow $F_3$). It is then discharged from the apparatus by the extraction pipes $11_1$, $11_3$, $11_5$.

By passing through the capillary tubes of assemblies $7a$ to $7d$ by diffusion in the direction of arrows $F_2$ through the wall of the tubes, the gaseous mixture is separated into an enriched fraction which is collected following arrows $F_2$ in an annular collection space 40 located at the periphery of the enclosure. It is then discharged therefrom by a pipe 13 located at the base of the enclosure.

It is pointed out that in such an apparatus the assemblies such as $7a$ to $7d$ may comprise one or more groups in which the microporous capillary tubes are directly sealingly marked on diffuser plates $3a$ and $5a$, $3b$ and $5b$, etc or in which the microporous tubes are fastened at each of their ends to group plates by means of which they are mounted on diffuser plates in the manner described hereinbefore. (FIGS. 5 and 6).

As an example, an apparatus of this type has been produced in which is installed four assemblies each having 750,000 microporous capillary tubes with an internal diameter of 1 mm, an external diameter of 1.5 mm, a length of 1.50 mm, a porosity of 20%, a permeability to air of $20.10^{-7}$ mole/cm$^2$/min/cm of Hg and an average pore radius of 100 Å. These assemblies are arranged in a cylindrical enclosure having an external diameter of 2.7 m and a total length of 9.50 m. The height of the successive chambers is 70 cm. The total gas flow which can be treated in an installation of this type is 99 kg of uranium hexafluoride per second. The intake flow rate into each assembly is 24.75 kg of uranium hexafluoride per second. This uranium hexafluoride is separated in each assembly into a depleted fraction with a flow rate of 12.375 kg/sec per assembly and an enriched fraction with a flow rate of 12.375 kg/sec per assembly.

An installation of this type is able to ensure the isotope separation at a high uranium hexafluoride flow rate.

What is claimed is:

1. A gaseous isotope separation apparatus comprising at least one assembly of microporous capillary tubes having a hydraulic diameter below 0.5 cm, an average pore radius below 200 Å, a thickness between 20 and 500 microns, a porosity between 10 and 60% and a permeability to air between $10.10^{-7}$ and $100.10^{-7}$ mole/cm$^2$.min. cm of mercury, the assembly of the microporous tubes being constituted by microporous tubes arranged parallel to one another and forming in said assembly a first series of ducts, called first ducts, defined by the inner wall of the tubes, said assembly having a plurality of longitudinal partitions integral with at least certain of the tubes and distributed between the tubes so as to define with the outer wall of the latter a second series of ducts, called second ducts, parallel to the first ducts, means for circulating a gaseous mixture to be separated through said tubes, said means causing said mixture to flow through said tubes in a laminar or near laminar manner, and further means for collecting the gas which has passed through the walls of the capillary tubes of each assembly.

2. An apparatus according to claim 1, wherein a cylindrical enclosure in which are successively arranged a plurality of assemblies of microporous tubes which are parallel to the enclosure axis, said assemblies being in each case mounted between two plates, called diffuser plates, and separated from one another so as to provide between two adjacent assemblies and at each of the ends of the enclosure successive chambers which alternately constitute distribution chambers for the gaseous mixture to be separated in the microporous tubes issuing into the latter and collection chambers for the gas leaving the tubes issuing into the latter, means for supplying the distribution chamber with the gaseous mixture to be separated, means for extracting from the said collection chambers the gas leaving the tubes of said assemblies and means for collecting the gas which has passed through the wall of the tubes of each of said assemblies.

3. An apparatus according to claim 1, wherein the tubes have a length of at least 25 cm.

4. An apparatus according to claim 1, wherein the tubes are made from an inorganic material chosen from the group including alumina, magnesia, titanium dioxide, silica, chromium oxide, mixed oxides of aluminium and magnesium, nickel and metal fluorides.

5. An apparatus according to claim 4, wherein the tubes are made from magnesium fluoride and nickel.

6. An apparatus according to claim 4, wherein the tubes are made from polytetrafluoroethylene.

7. An apparatus according to claim 1, wherein the tubes are made from an organic material.

8. An apparatus according to claim 1, wherein the tubes of the assembly are mounted on plates, the partitions extending from one of said plates to the other and have openings for discharging the separated gas circulating in the second ducts.

9. An apparatus according to claim 1, wherein the tubes of the assembly are mounted on two plates, the partitions extending from one of said plates to the vicinity of the other of said plates in such a way as to provide openings for discharging the separated gas circulating in the said second ducts in the vicinity of the other of said plates.

10. An apparatus according to claim 1, wherein the tubes and partitions are so mutually arranged that the second ducts all have the same cross-section.

11. An apparatus according to claim 9, wherein the ratio of the cross-section of the second ducts to the cross-section of the first ducts is between 1 and 20.

12. An apparatus according to claim 5, wherein the partitions are made from the same material as the tubes.

13. An apparatus according to claim 5, wherein the tubes have a circular cross-section and are arranged in the assembly in parallel rows, the tubes of each row being in tangential contact with one another and the longitudinal partitions being distributed between two adjacent rows of tubes.

14. An apparatus according to claim 1, wherein the tubes have a square or rectangular cross-section and are arranged in parallel rows in said assembly, the tubes of each row being in contact with one another by one of their edges and the longitudinal partitions being distributed between two adjacent rows of tubes.

15. A gaseous isotope separation apparatus comprising at least one assembly of microporous capillary tubes having a hydraulic diameter below 0.5 cm., an average pore radius below 200 Å, a thickness between 20 and 500 microns, a porosity between 10 and 60% and a permeability to air between $10.10^{-7}$ and $100.10^{-7}$ mole/cm$^2$.min.cm of mercury, said assembly being constituted by an alveolar or honeycomb module, whose walls made from microporous material define rows of parallel channels having a square or rectangular cross-section and constitute the microporous capillary tubes, said rows alternately forming a first series of ducts, called first ducts, in which the gaseous mixture to be separated is circulated, and a second series of ducts, called second ducts, in which is collected the gas separated by diffusion through the wall of said first ducts, means for circulating a gaseous mixture to be separated through said tubes, said means causing said mixture to flow through said tubes in a laminar or near laminar manner, and further means for collecting the gas which has passed through the walls of the capillary tubes of each assembly.

16. An apparatus according to claim 15, wherein these second ducts are sealed at each of their ends, openings being provided in each row of said second ducts so as to discharge the gas separated by the side walls of the module.

17. An apparatus according to claim 15, wherein a cylindrical enclosure in which are successively arranged a plurality of assemblies of microporous tubes which are parallel to the enclosure axis, said assemblies being in each case mounted between two plates, called diffuser plates and separated from one another so as to provide between two adjacent assemblies and at each of the ends of the enclosure successive chambers which alternately constitute distribution chambers for the gaseous mixture to be separated in the microporous tubes issuing into the latter and collection chambers for the gas leaving the tubes issuing into the latter, means for supplying the distribution chamber with the gaseous mixture to be separated, means for extracting from the said collection chambers the gas leaving the tubes of said assemblies and means for collecting the gas which has passed through the wall of the tubes of each of said assemblies.

18. An apparatus according to claim 15, wherein the tubes have a length of at least 25 cm.

19. An apparatus according to claim 15, wherein the tubes are made from an inorganic material chosen from the group including alumina, magnesia, titanium dioxide, silica, chromium oxide, mixed oxides of aluminum and magnesium, nickel and metal fluorides.

20. An apparatus according to claim 19, wherein the tubes are made from magnesium fluoride and nickel.

21. An apparatus according to claim 19, wherein the tubes are made from polytetrafluoroethylene.

22. An apparatus according to claim 15, wherein the tubes are made from an organic material.

* * * * *

UNITED STATES PATENT AND TRADEMARK OFFICE
CERTIFICATE OF CORRECTION

PATENT NO. : 4,427,424

DATED : January 24, 1984

INVENTOR(S) : Jean Charpin et al.

It is certified that error appears in the above—identified patent and that said Letters Patent is hereby corrected as shown below:

Column 3, lines 32 and 33, "and 96 r the compression" should be changed to read -- and $\tau r$ the compression --;

Column 3, line 63, "$V_2$" should be changed to read -- $\overline{V}_2$ --;

Column 4, line 2, "$Z = 1 - \alpha \frac{R_e r_h}{L}$" should be changed to read -- $Z = 1 \underline{\alpha} \frac{R_e r_h}{L}$ --;

Column 4, line 7, " a " (first occurrence) should be changed to read -- $\underline{a}$ --;

Column 4, line 9, " a " (second occurrence) should be changed to read -- $\underline{a}$ --;

Column 5, line 39, "petitions" should be changed to read --partitions--;

Column 14, line 16, "1.50 mm" should be changed to read -- 1.50 m --;

Column 15, claims 12 and 13 should be amended to depend from claim 1.

Signed and Sealed this

Twenty-ninth Day of January 1985

[SEAL]

Attest:

DONALD J. QUIGG

Attesting Officer     Acting Commissioner of Patents and Trademarks